(12) United States Patent
Wan et al.

(10) Patent No.: US 7,899,698 B2
(45) Date of Patent: Mar. 1, 2011

(54) REAL-TIME SALES SUPPORT AND LEARNING TOOL

(75) Inventors: Dadong Wan, Palatine, IL (US); J. C. Groon, Chicago, IL (US); Harpreet Marwaha, St. Charles, IL (US); Mitu Singh, Glendale Heights, IL (US)

(73) Assignee: Accenture Global Services Limited, Dublin (IE)

( * ) Notice: Subject to any disclaimer, the term of this patent is extended or adjusted under 35 U.S.C. 154(b) by 1668 days.

(21) Appl. No.: 10/804,580

(22) Filed: Mar. 19, 2004

(65) Prior Publication Data
US 2005/0209868 A1    Sep. 22, 2005

(51) Int. Cl.
*G06F 17/30* (2006.01)
(52) U.S. Cl. ............... 705/10; 705/1; 705/21; 705/26; 370/356; 395/210
(58) Field of Classification Search ............... 705/80, 705/1
See application file for complete search history.

(56) References Cited

U.S. PATENT DOCUMENTS

| | | | | |
|---|---|---|---|---|
| 4,973,952 A | * | 11/1990 | Malec et al. | 340/5.91 |
| 5,553,312 A | * | 9/1996 | Gattey et al. | 455/11.1 |
| 5,979,757 A | * | 11/1999 | Tracy et al. | 235/383 |
| 6,067,525 A | * | 5/2000 | Johnson et al. | 705/10 |
| 6,125,356 A | * | 9/2000 | Brockman et al. | 705/37 |
| 6,434,530 B1 | * | 8/2002 | Sloane et al. | 705/1 |
| 6,446,076 B1 | | 9/2002 | Burkey et al. | 707/102 |
| 6,542,602 B1 | | 4/2003 | Elazar | 379/265.06 |
| 2002/0006126 A1 | * | 1/2002 | Johnson et al. | 370/356 |
| 2002/0133545 A1 | | 9/2002 | Fano et al. | 709/203 |
| 2002/0160772 A1 | | 10/2002 | Gailey et al. | 455/428 |

FOREIGN PATENT DOCUMENTS

| | | |
|---|---|---|
| EP | 1 076 329 A2 | 7/2000 |
| WO | WO 99/14688 | 3/1999 |
| WO | WO 02/073331 A2 | 9/2002 |

OTHER PUBLICATIONS

Examination report issued in connection with counterpart European patent application No. 05739603.8, dated Apr. 16, 2007, 13 pages.
International Preliminary Examination Report issued in PCT application No. PCT/EP/2005/002831, Sep. 28, 2006, 11 pages.
"FAST: future technology for today's industry", Ockerman, Najjar and Thomson, Computers in Industry 38 (1999), Elsevier Science B.V., pp. 53-64.

* cited by examiner

*Primary Examiner* — R. D Rines
(74) *Attorney, Agent, or Firm* — Fish & Richardson P.C.

(57) ABSTRACT

A real time sales support method includes automatically monitoring an interaction between a sales agent and a customer. One or more contexts of the interaction are determined and, based on the contexts, stored information relevant to the interaction is automatically retrieved. The retrieved information is provided in an electronically presentable format to the sales agent to be shared with the customer.

20 Claims, 14 Drawing Sheets

| Standards | Speed | Frequency | Range | Compatability | Popularity |
|---|---|---|---|---|---|
| 802.11a | Up to 54 Mbps | 5 Ghz, less crowded band with less interference | Limited. Indoors no more than 30m; outdoors No more than 60m unless external Antenna is added to the device to Amplify the radio signal | Limited. Not compatible with 802.11b and 802.11g | New standard. Less common network since 802.11a does not satisfy the telecom regulation of some countries |
| 802.11b | Up to 11 Mbps | Crowded 2.4 Ghz Band, interference Could occur with Other 2.4 Ghz devices | Good Indoors up to 50m; in open space Up to 150m. External antennae Can be applied to amplify the radio signal | Compatible with 802.11b and 802.11g only | Most common wireless network so far, satisfies the telecom regulation of most of the countries |
| 802.11g | Up to 54 Mbps | Crowded 2.4 Ghz band, interference could occur with other 2.4 Ghz devices | Good Indoors up to 50m; in open space up to 150m. External antennae can be applied to amplify the radio signal | Compatible With 802.11b and 802.11g only | New Standard; rapid market growth with the demand of high speed; satisfies the telecom regulation of most countries |

Home Theater > Television > Flat-Panel TV > Plasma TV

Plasma Display
- 42" Widescreen
- Plasma EDTV Display Panel

Our Price: $2,999.99
You Save: $300.00
Sale: $2,699.00

- 42"
- 16:9 Widescreen
- Plasma HDTV Monitor

Our Price: $4,999.99

- 42" Widescreen
- EDTV Monitor with 480p
- Digital Image Scaling Technology
- Silver / Black Our Price: $4,499.99

- 50" Widescreen
- HD-Ready Plasma TV
- HDMI and PC Inputs
- Silver

Our Price: $8,999.99

Related Products:

4-Shelf TV and Audio/Video Stand-Black / Silver
Model: AFAb

Progressive-Scan DVD Player
4-Head Hi-Fi Stereo VCR Combo

3-Way Tower Speakers
DP-SP21

1.5m Premium Component Video Cable
MV2CV

F Series Surround Speaker System

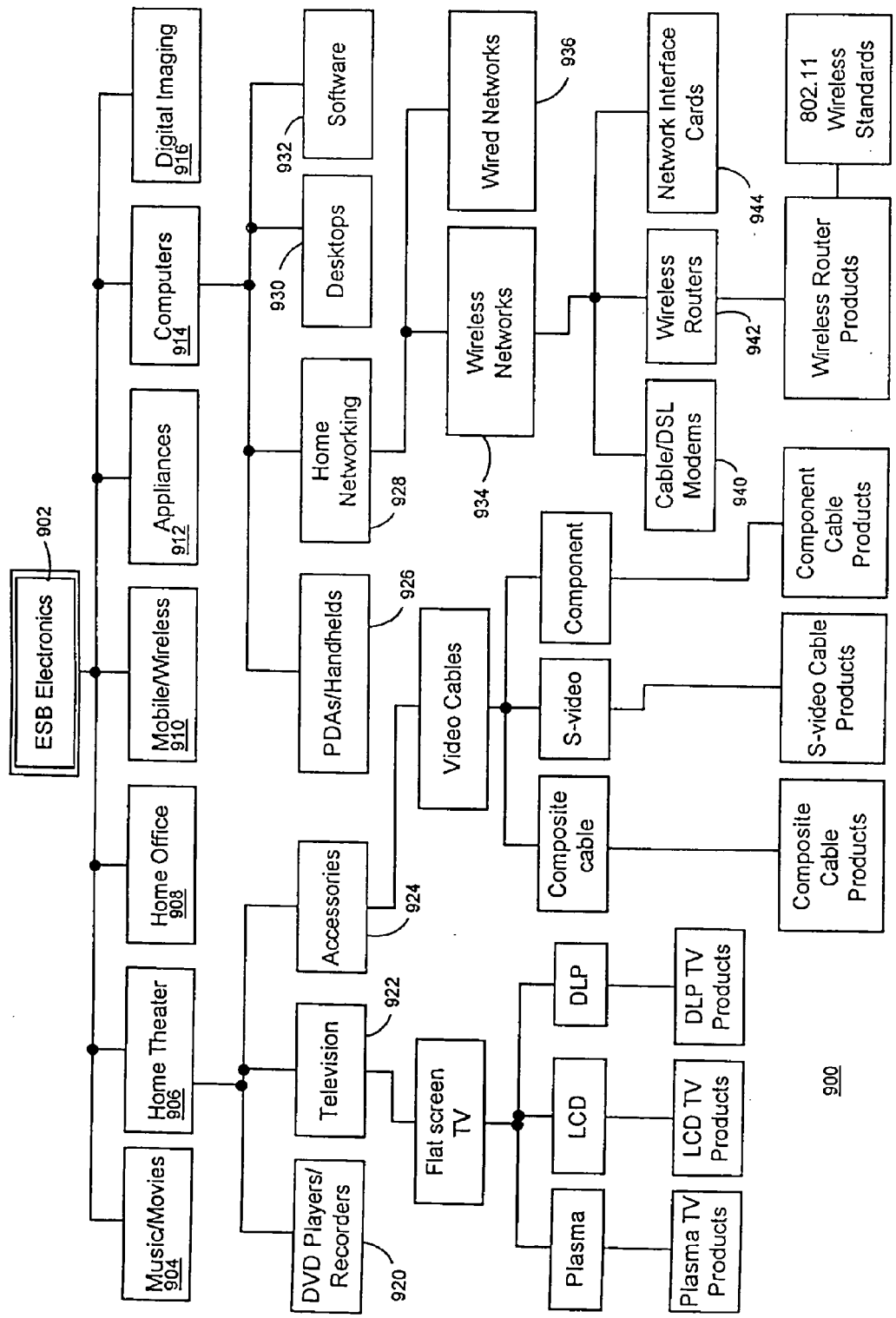

REAL-TIME SALES SUPPORT AND LEARNING TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to data presentation and collaboration tools. More particularly, the present invention relates to a real-time sales support and learning tool.

Many environments in business and elsewhere require collaboration and communication between individuals to convey knowledge and information to one of them with the assistance of another. The knowledge recipient has particular requirements and questions that need to be satisfied. The knowledge agent has access to the information and the ability to help solve those questions. Conveying information and getting questions answered is a goal of both parties.

One particular environment where this situation occurs is the retail sales environment. A customer is in need of information about products and services for sale. A sales agent has some information to help answer the customer's questions, but maybe not all the necessary information. The customer's questions may be very general if the customer is new to the field or just beginning the acquire information. If the customer is more knowledgeable, or as the sales transaction proceeds, the customer's questions can become very specific.

An example is retail sales in a home appliance store. Such a store sells a variety of electronics, such as desktop and laptop computers, video systems including televisions and digital video disk (DVD) systems, audio systems, telecommunications systems including cellular and cordless telephones, and durable goods such as laundry systems, refrigerators and ranges. A sales agent in such a store can be expected to sell any of these products or any subset of these products. Each of these product groups presents a different context for customer interaction. Moreover, multiple manufacturers provide products within a product group, presenting other, different contexts for the sales agent. The sales agent can expect the widest range of questions about these product manufacturers, as well. Each customer's level of sophistication presents yet another context to which the sales agent must respond.

Additional challenges face the sales agent in this environment. Products are updated frequently and new features often become available. More and more products and features are converging, such as personal computers with audio and video interfaces, requiring ever broader knowledge by the sales agent. Marketing techniques change too, as product specials are offered to customers or store sales goals are implemented—all of which must be a part of the knowledge base which the sales agent must possess. Moreover, the information must be readily at hand. Customers may not have time or patience to retrieve information from printed sources such as product brochures or from centrally located—and therefore, less convenient—sources such as electronic kiosks and the like. Information should be available in real time, where the customer is located with the sales agent.

On the other hand, labor is one of the largest cost components of any retail business. Increasingly, retailers face high labor turnover rates and short product shelf life. As a result, there is little incentive for retailers to invest heavily in staff training. At the same time, as competition in retailing increases, there is increased emphasis on providing customer service. This calls for knowledgeable sales agents who can respond to the inquiries of the customer in a timely fashion and work to achieve sales and service goals of the retailer as well. In particular, a substantial technical problem is presented by the need to have near-real-time, context-specific information such as product information available for use by the sales agent who may operate in many different contexts and who may not be fully trained about the product and related products and services. The technical problem includes identifying the current context, locating appropriate information and getting the information to the sales agent in a short enough time to be responsive to the customer. The sales agent requires assistance to collaborate with the customer to determine the customer's information needs and fill those needs.

The retail sales environment is just one example of an environment in which such collaboration is required. In other environments as well, two or more individuals need to work together to achieve a common goal such as completing a sale. However, having ready access to necessary information, when the need for that information can arise in a variety of contexts, presents an increasing challenge.

Accordingly, there is a need for an improved, context-sensitive collaboration tool for retrieving and conveying needed information in a time-efficient manner.

BRIEF SUMMARY

By way of introduction only, the present embodiments provide a solution to the gap between the point of sensing a customer's need and the point of delivering the content/knowledge of use to both the sales agent and the customer. The disclosed embodiments fill in the gap by continuously and proactively monitoring the context of the interactions between the sales agent and the customer, including location, topics, brands, and product names. The system then uses this contextual information to automatically extract and display the matched product information that helps the customer make a right buying decision. In so doing, it saves both the sales agent and customer time and effort, and helps improve the overall shopping experience.

By gleaning the context relevant to the interaction, the system has the ability to jump to a "leaf node" of information within the larger hierarchical tree of content. This frees the customer from conducting searches or laboriously clicking through volumes of text. The information provided in the customer service context fills the information need of the customer.

In one aspect, the present invention provides a real-time learning and performance support tool. Exemplary embodiments are built on a number of emerging technologies including Tablet Personal Computers (PCs), Bluetooth wireless communication, speech recognition, 802.11 wireless communication, and knowledge modeling. In a typical usage embodiment, a user such as a sales associate in an electronics retail store wears a small Bluetooth ear-set, and carries a tablet PC. When he meets with a customer that has a specific question he cannot answer, he paraphrases or simply repeats the question. The Bluetooth ear-set picks up the voice stream for processing by other components of the system. The application uses speech recognition to discern the type of conversation by looking for specific keywords or phrases being used. When a match is found, the system retrieves related product information from various sources, and displays it on the tablet screen, which may then be shared with the customer. To keep the user's attention focused on the customer, the application whispers to the user through the Bluetooth ear-set when a match is found. Thus, the user only shifts his attention to the tablet when he is sure the right content is there. The prototype also uses an 802.11-based location engine to pinpoint the current location of the user and the customer in the electronics retail store. This helps improve accuracy by looking only for product stock keeping units (SKUs) that fall into the specific department rather than the entire store.

Underlying some embodiments is a knowledge-based approach, which tells the application what to listen to as well as how to respond to specific triggers. The premise is that, in any sales domain, there are a relatively small number of customer interactions that account for a majority of transactions and profits. The key is to be able to model these types of canonical situations, and embed the resulting models in the application so that they are accessible to all personnel. In retail, customer interactions typically encompass two elements: dialogue patterns and product information. For example, a typical conversation might start with questions like "where can I find X," "I'm interested in X," or "can you tell me the difference between X and Y?" (where X and Y are product or category names like "wireless routers," "digital cameras," or "plasma television"). To recognize these patterns, the application embodies a set of customized grammars. In addition, the system may also employ a knowledge map for products and related topics so that, when a response is recognized, such as "you seem to be interested in home networks," the system knows where the product tree is to take the customer to, and what kind of content to show on the tablet PC.

The disclosed embodiments feature a novel use of speech recognition to facilitate customer interactions. Although speech technology is increasingly available, its applications today are of two kinds: telephony based interactive voice response (IVR), and multi-modal interface to computers and other digital devices. In the presently disclosed embodiments, in contrast, speech is used as a sensing mechanism that continuously listens to the current conversation, and seamlessly invokes appropriate knowledge items when the right trigger is hit. To further personalize the experience, this conversational context may be combined with other types of information about a specific customer, including real-time location and past purchases.

In today's highly competitive retail environment, the disclosed system can provide retailers a powerful means of helping reduce cost and improve the quality of services. Toward that end, the presently disclosed embodiments can serve as a just-in-time learning tool and as a real-time performance support tool.

As a just-in-time learning tool, the system can reduce the amount of upfront training required by proactively delivering to the sales associate the right knowledge about products of interest to the current customer. The system enables the sales associate to be more knowledgeable and helpful. The tool also allows cross-selling and up-selling of products that the sales associate might not have known about before. For customers who are accustomed to finding their own way inside the store, the presence of the tool has a "pull-in" effect, which draws them into potentially fruitful interactions, collaborative product exploration, and ultimately, sales.

As a real-time performance support tool, the system is easily adaptable to settings other than retail stores, including sales force and customer support. In pharmaceutical sales, for example, face-to-face time with physicians is often difficult to come by and brief in duration; yet it has critical impact on physician prescribing behavior. The pharmaceutical seller must ensure that the right marketing and sales messages are consistently delivered to physicians at just the right time. The present system can enable the salesperson to break away from a typical canned sales presentation and dive right into the relevant content points based on the physician vocal response as detected and processed by the system. It can help improve the effectiveness of physician interaction by adapting the message to the individual as well as to the specific situation.

Alternatively, in a call-center scenario, a similar application can be used to listen to the conversation between the customer and the support representative. When certain trigger phrases or keywords are mentioned and detected by the system, appropriate help information can be automatically retrieved by the system and immediately displayed. With this timely targeted information, the representative will be better equipped to help the customer, and the average waiting time can also be significantly reduced.

Further objects and advantages of the present invention will be apparent from the following description, reference being made to the accompanying drawings wherein preferred embodiments of the present invention are clearly shown.

BRIEF DESCRIPTION OF THE DRAWINGS

FIG. 6 shows an exemplary screen shot with content produced in response to detection of the keyword WIRELESS STANDARDS;

FIG. 8 shows an exemplary screen shot with content produced in response to a clickthrough on the hyperlink Plasma TV of FIG. 7.

FIG. 9 is an exemplary product knowledge tree for use with the departments in the exemplary home appliance and electronics store of FIG. 3.

DETAILED DESCRIPTION OF THE DRAWINGS AND THE PRESENTLY PREFERRED EMBODIMENTS

Figure 1:
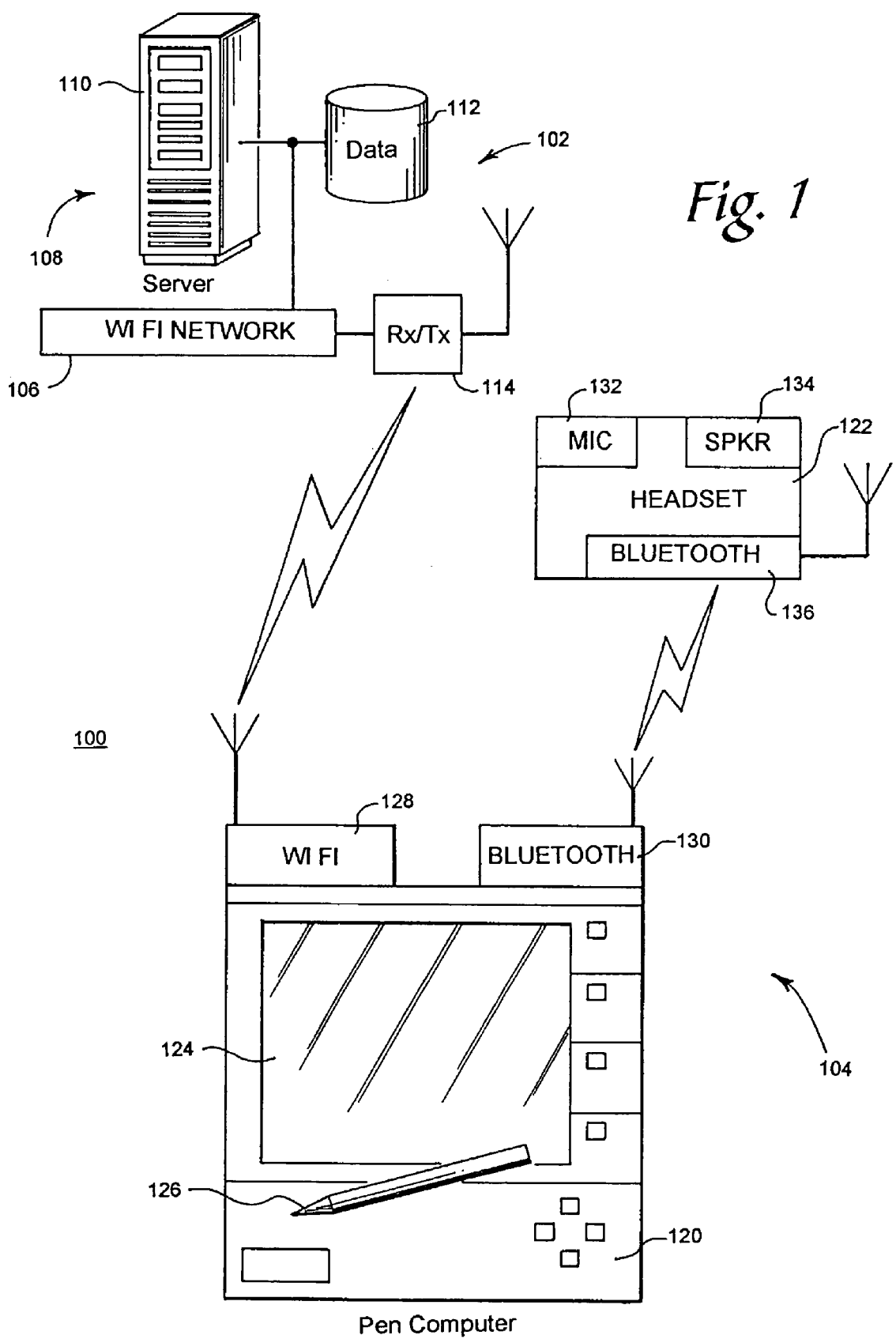
FIG. 1 is a block diagram of a system implementing a real-time sales support and learning tool.

Referring now to the drawing, FIG. 1 shows a block diagram of a system 100 implementing a real-time sales support and learning tool. The system 100 is particularly useful for providing a real-time performance support tool, for example to a sales agent interacting with a customer in a retail sales environment. The system 100 is further particularly useful for providing a just-in-time learning tool which provides needed instruction to a sales agent at the time the instruction is needed during a customer interaction. The system 100 is still further particularly useful for providing a collaboration tool which enables collaboration between the sales agent and the customer to meet the customer's purchase needs. Each of these aspects of the system 100 will be described in further detail below.

The system 100 includes a communication infrastructure 102 and one or more portable computer system s 104. In one embodiment, the communication infrastructure is installed in a retail sales store. Sales agents employed by the retail sales store are equipped with portable computers such as the portable computer system 104 while the sales agents are working on the sales floor of the store. The sales agents interact with customers, identify customer product and service requirements, answer customer questions and respond to other customer inquiries. The system 100 becomes a participant in these customer interactions.

The communication infrastructure 102 generally includes a wireless communication network 106 and a server system 108. The server system 108 further includes a server 110 and a database 112. The arrangement shown in FIG. 1 is exemplary only. Other embodiments will include other types of devices and other configurations, some of which will be described generally below.

The wireless communication network 106 may be any suitable network providing data communication, such as a WiFi network. WiFi is a wireless data network also referred to as 802.11 or 802.11(b) or 802.11 (g), referring to the standard published by the Institute of Electrical and Electronics Engineers, Incorporated. Other types of wireless data communication, such as communication according to published standards or other non-standardized communication, may be used in place of or in addition to WiFi in the wireless communication network 106. A variety of suitable communication networks, implementing the WiFi standard or other standards, are available from several vendors.

Preferably, the wireless communication network 106 includes a network controller and one or more radio circuits such as radio circuit 114 positioned throughout the area served by the system 100. In the exemplary retail sales environment, the wireless communication network 106 includes at least one radio circuit 114 in each department of the store. Only one radio circuit 114 is shown in FIG. 1 so as to not unduly complicate the drawing figure. Each radio circuit serves a designated area, providing radio communication to portable radio devices such as the portable computer system 104 in the designated area. The radio circuit 114 includes a radio receiver and radio transmitter for radio communication with suitably-equipped devices in the area served by the radio circuit. The radio circuit 114 also includes a data communication interface for wireline data communication with other radio circuits and the network controller of the wireless communication network 106. In this manner, data communicated over radio links by the radio circuit can be communicated with other locations in the system, such as the server system 108.

The server system 108 in the exemplary embodiment includes the server 110 and the database 112. In other embodiments, the respective elements may be replaced with other components capable of performing the functions described herein. For example, instead of a single server 110 and database 112, the server system 108 may include several servers accessing several databases. Partitioning of the system may be based on a variety of factors, such as cost and required performance. In many environments, near-real-time performance is required for retrieval of information from the database 112 by the server 110, so this design goal may predominate over others.

In the illustrated embodiment, the server 110 includes hardware and software to implement the functionality described herein. Any suitable hardware may be used. In one embodiment, the Microsoft Speech Server software is used to perform speech processing as described herein. Other software packages may be substituted. The server receives information including about the interaction between a sales agent equipped with the portable computer system 104 and a customer. The information preferably includes recorded or encoded speech. The server 110 processes the information including the speech, for example to identify key words or concepts contained therein. In response to identified key words, the server 110 accesses the database 112 to retrieve relevant product information. The server 110 then serves data including the relevant product information to the wireless communication network 106 for communication to the portable computer system 104.

The database 112 stores information for access by the server 110 and presentation over the wireless communication network 106 to the portable computer system 104. The data may be stored in any data format. In the exemplary embodiment, the data relates to product information about products for sale in the retail sales store. The information may be very specific, such as features or technical specifications of a particular make and model device. The information may also be very general, such as information about classes of products or technologies. The data stored may define information which is textual, graphical, audio, video or any combination which can be delivered to and used by the portable computer system 104.

In the exemplary embodiment of FIG. 1, the portable computer system 104 includes a portable computer 120 and a wireless headset 122. The portable computer 120 includes a display 124, a stylus 126, a WiFi radio interface 128 and a Bluetooth radio interface 130. The portable computer 104 may be any sort of processing and data display device which may be readily carried by a sales agent working on a retail sales floor. One example is referred to as a tablet personal computer (PC) and has a user interface that includes the display 124 and the stylus 126. An operator such as the sales agent interacts with the tablet PC using the stylus 126 to activate portions of the display 124 and by viewing the display 126 produced by the tablet PC's operation. One example of a suitable tablet PC is manufactured by Hewlett Packard, Palo Alto, Calif.

The WiFi radio interface 128 is a radio circuit which permits wireless radio communication between the portable computer 120 and another radio circuit with matching capability. In the embodiment of FIG. 1, the WiFi radio interface 128 communicates with the radio circuit 114 of the radio network 106. Any other radio communication may be substituted for the WiFi communication provided by the WiFi radio interface 128. A radio standard defines frequencies and data interchange protocols for use by both receiver and transmitter in a radio link. Suitable WiFi radio circuits are available from a variety of vendors.

The Bluetooth radio interface 130 is a radio circuit which provides wireless radio communication between the portable computer 120 and another radio circuit, such as a matching radio interface of the wireless headset 122. Bluetooth is a radio transmission and reception standard providing high speed data communication over a relatively short range (e.g., 10 m). In the exemplary embodiment of FIG. 1, a Bluetooth link is established with the wireless headset 122 so that signals representative of audio may be exchanged with the wireless data headset 122. The Bluetooth radio interface 130 converts digital electrical signals from the portable computer 120 to radio signals for transmission. Similarly, the Bluetooth radio interface 130 receives radio signals and converts them to digital electronic data signals. Suitable Bluetooth radio circuits are available from a variety of vendors.

The wireless headset 122 may be any conventional headset capable of wireless communication using a radio standard such as Bluetooth. The wireless headset 122 includes a microphone 132, a speaker 134 and a Bluetooth radio interface 136. The microphone 132 produces electrical signals in response to sounds such as speech detected by the microphone 132. The speaker 134 plays audible sound in response to electrical signals representative of the sound. The Bluetooth radio interface 136 provides radio communication of the audio signals from the microphone 132 to the portable computer 120 and of audio signals from the portable computer 120 to the speaker 134.

In other embodiments, any suitable wireless communications standard may be used, including optical standards such as the IrDA infrared data exchange standard. In still other embodiments, the Bluetooth radio interfaces 130, 136 may be omitted and a wireline headset may be used in conjunction with the portable computer 120. A wireline connection may be preferred in some applications which are electrically noisy, such as an electronic appliance store where many appliances are present to generate electromagnetic noise or many other Bluetooth devices are present and active. However, in general, a wireless headset 122 is preferred so that the participation of the portable computer, in conjunction with the wireless communication network 106, may be as non-obtrusive as possible.

The portable computer 120 further includes other conventional components to provide full PC functionality. These components include a processor and memory for storage of data and software applications. The portable computer 120 includes an operating system, such as the Windows XP® operating system from Microsoft Corp., Redmond, Wash. For use in conjunction with the system 100, the portable computer 120 may have its functionality reduced or tailored to its specialized operation. Thus, applications which have little or no use in the system 100, such as word processing and spreadsheet applications, are omitted. Other applications, which are directly used in the system 100 such as data transfer from the server system 102 and speech processing, may be optimized on the portable computer.

Figure 2:
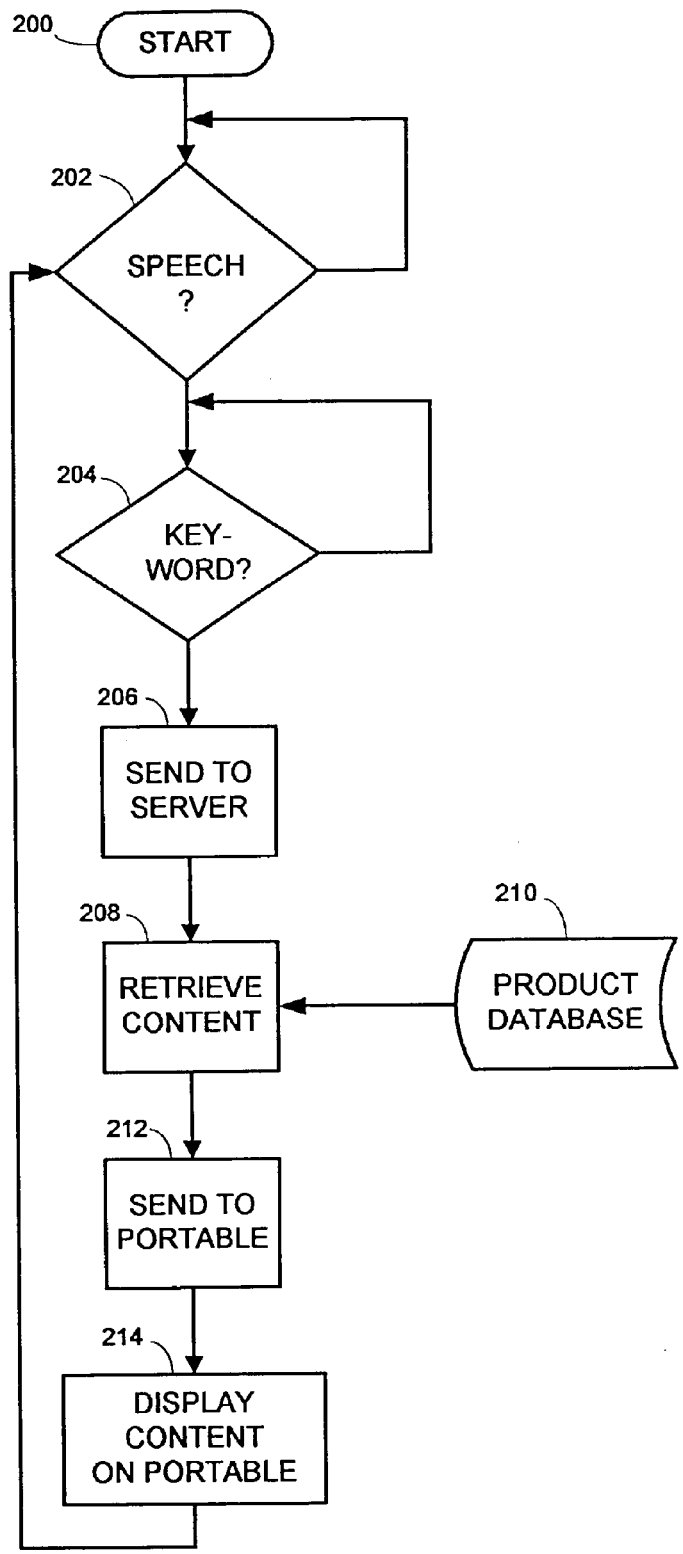
FIG. 2 is a flow diagram illustrating a method of operating the system of FIG. 1.

FIG. 2 is a flow diagram illustrating one method for operating the system 100 of FIG. 1. The method begins at block 200. A variety of operational embodiments may be implemented. In one embodiment the system 100 operates as a real-time performance support tool. One example of this embodiment may be implemented in a retail sales environment such as a home appliance and electronics store. A sales agent employed by the store wears the wireless headset 122 and carries the portable computer 120. In one embodiment, when the sales agent encounters a customer and faces a question from the customer he cannot answer, he paraphrases the question. Meanwhile, the system operates in a loop, block 202, determining if any speech is detected. If speech is detected by the microphone 132 of the wireless headset 122, control proceeds to block 204. The system then operates in a loop, monitoring the spoken words, searching for an identified keyword. Keywords are previously identified words which, when detected, cause the system to retrieve relevant content from the database of the server system. The relevant content includes, for example, product information selected based on the detected keyword.

During this process, the microphone 132 of the wireless headset 122 detects the words spoken by the sales agent. The spoken words are converted to digital data which is transmitted over the Bluetooth radio link to the portable computer. The speech recognition application operating on the portable computer 120 detects keyword(s) from the conversation. In one embodiment, one or more grammars are implemented to process the speech, detect predefined keywords and return keyword values. One example of grammar processing to detect keywords will be described below in conjunction with FIGS. 10-14. Any number of keywords and keyword combinations may be predefined. Preferably, the keywords are closely associated with the nature of the interaction being monitored, such as product types, product categories, departments, brand names, etc.

The keywords are conveyed over the WiFi radio link to the server system 108, block 206. The server system 108 uses the keyword to look up the product database. Product data are retrieved from the database 210 by the server, block 208. The product data are conveyed over the WiFi link to the portable computer 120, block 212. The portable computer 120 then displays the matched content on the tablet 124, block 214.

It is to be understood that processing of speech and accessing the product database can be done using any convenient device, anywhere in the system. The embodiment illustrated in FIG. 1 is exemplary only. In other embodiments, the portable computer may have much reduced processing and data storage capability, such as a PDA. In an application using such a device, more speech processing will be shifted to a remote location, such as a the speech server, to identify keywords and access the database. In other applications, the size of the database and processing power of the portable computer may be such that all processing is done locally, with speech processed to find keywords and the database accessed on a hard disk or other storage medium at that portable computer. Thus, the processing and data storage burdens may be partitioned in any convenient manner.

The application continues monitoring the conversation at block 202. In the embodiment of FIG. 2, the content retrieved from the server system is displayed on the portable computer 120. Preferably, the content is arranged with graphical and textual information and hyperlinks to additional content. As the customer's questions are answered and additional questions arise, the sales agent may use the stylus 126 to actuate hyperlinks in the display and navigate the content to find additional information. By following additional hyperlinks, additional pages of information can be displayed. Meanwhile, the system continues to monitor the conversation between the sales agent and the customer to search for keywords. If a keyword is detected, the relevant content is retrieved and provided to the portable computer for use by the sales agent. In this manner, the system is operated as a real-time sales support tool for answering customer questions, identifying products or services desired by the customer and closing the sale.

In an alternative embodiment, instead of solely displaying content on the portable computer, the wireless headset is used to convey product-relevant content to the sales agent. To avoid taking the sales agent's attention away from the customer (by having to constantly look at the tablet display), in one embodiment the application uses the wireless headset 122, FIG. 1, and "whispers" to the sale agent information that is displayed on the portable computer 120 or information that supplements the displayed information. This can be accomplished by conveying from the server system 102 audio data and instructions that cause the portable computer 120 to convey the audio data over the Bluetooth wireless link so that the wireless headset 122 can decode the audio data and play the content as speech into the sales agent's ear. Thus, the sales agent only needs to look at the tablet display when he thinks the matched content is shown there.

In the embodiment illustrated in FIG. 1, some speech processing is done at the portable computer. The bulk of the speech processing, including identifying spoken keywords and relevant content, is performed at the server system 102. In alternative embodiments, all speech processing can be performed at the portable computer 120. This eliminates the need for the WiFi radio link and the wireless communication network 106, as well as the server system. Also, if the portable computer 120 has an on-board microphone, the system can directly monitor both sides of the interaction, not just the sales agent's paraphrasing of the customer's questions. In this modified embodiment, the Bluetooth wireless link and the wireless headset 122 can be eliminated from the system 100. It will be appreciated that the functionality of the system among the illustrated components and others not illustrated in FIG. 1 may be partitioned in any suitable manner. Partitioning may be based on performance goals (such as near-real-time processing, as required by the illustrated system), cost, availability of suitable components, and other factors.

To improve accuracy of the server in identifying the relevant information required by the customer, geographic information about the interaction between the customer and the sales agent may be used. For example in the exemplary embodiment of a system operating in a home appliance and electronics store, the system 100 can more quickly and reliably identify the information sought by the customer. If the interaction begins in an area of the store devoted to home electronics, and if the system 100 can be made aware of that geographic information, the system 100 can reduce its processing of speech data by focusing on identifying keywords related to home electronics, and avoiding keywords related to home appliances.

Figure 3:
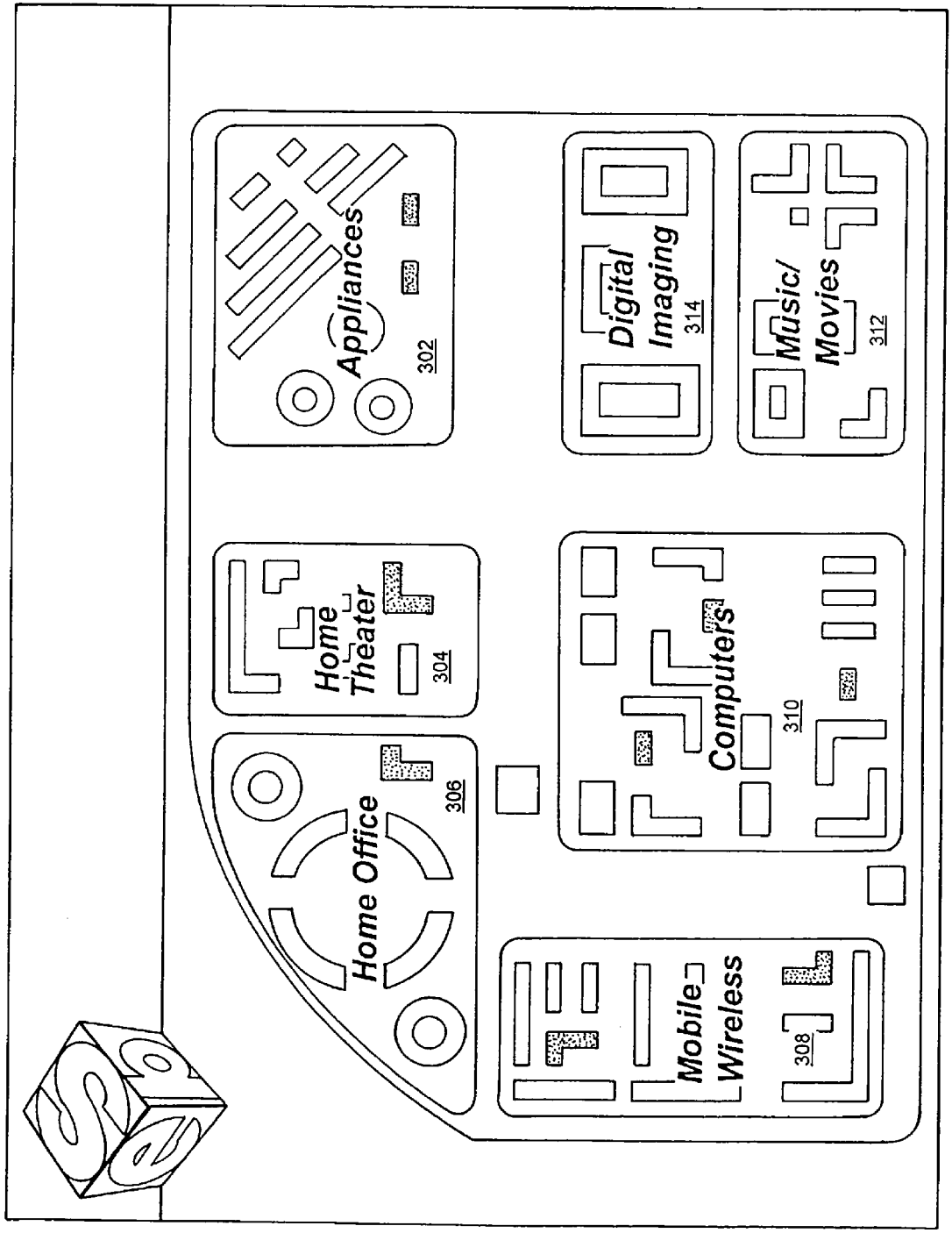
FIG. 3 illustrates the arrangement of departments in an exemplary home appliance and electronics store.

FIG. 3 illustrates this. FIG. 3 illustrates the arrangement of departments in an exemplary home appliance and electronics store 300, designated in this example as ESB Electronics. In the example, the store 300 includes an appliance department 302, a home theater department 304, a home office department 306, a mobile and wireless communication department 308, a computers department 310, a music and movies department 312, and a digital imaging department 312. In conventional retailing style, related products are grouped together. Information about this grouping and physical location in the store can be used by the system 100 (FIG. 1).

In one embodiment, the system determines the geographic location within the store 300 of the interaction between the sales agent and the customer. The system 100 of FIG. 1 makes use of an 802.11b based location engine to pinpoint the current location of the sale rep and the customer. Such an engine operates in conjunction with the wireless communication network 106 of FIG. 1. The network 106 includes a plurality of radio circuits positioned through the store 300. For example, antennas and the radio circuits themselves may be located in ceiling recesses above the sales floor of the store 300. Any of a variety of algorithms may be used to determine the position of the portable computer 120 in relation to two or more radio circuits of the network 106. With that relative positioning information and information about the exact location of radio circuits in the store, the engine can locate with precision the portable computer 120 in the store. Thus, the WiFi wireless communication network 106 of FIG. 1 may be used to locate the portable computer 120 in the store. Other geo-location systems may be used to provide similar information to the system. By knowing the location of the interaction between sales agent and customer, the system 100 may look only for products or SKUs that fall into the department where the sales agent and portable computer are currently located.

It may be seen that the server system 102 selects and serves content based on the context of the interaction between the sales agent and the customer. The context of the interaction typically includes several independent and dependent contexts. In the exemplary embodiment system installed in a home appliance and electronics store, one context is the general product area about which the customer inquires, home appliances such as refrigerators, washers and dryers, and home electronics such as televisions and computer equipment. Within the context of computer equipment, additional dependent contexts may be identified, such as wireless local area network equipment, laptop computers and routers. Thus, the speech information detected from the interaction and the keywords provide contextual information for the system 100.

Further, the geographic location of the interaction provides additional contextual information. The system may determine from the location of the interaction provided by the wireless communication network that the customer and the sales agent are currently located in the home appliance department 302. This geographic information may be used to select from the database relevant content. This information may also be used with speech-based context information to better refine the nature of the customer's inquiry. For example, if the system 100 identifies the keywords "microprocessor controlled" in the interaction, the value to the system for identifying relevant information based on this context data alone is small. On the other hand, if the system 100 can correlate the detected keyword with the geographic information that the interaction occurs in the home appliance department 302 of the store 300, the system 100 can assume that the customer is inquiring about appliances with advanced control systems, and retrieve content on that topic for display on the portable computer. Thus, the system is sensitive to a variety of contexts of the interaction with the customer. When contextual information is available, the content provided in real time to the portable computer for use by the sales agent can be tailored based on a plurality of contexts. This speeds the retrieval process and focuses the information on responding to the true need of the customer.

In some cases, there is too much content to be displayed readably on the tablet screen of the portable computer. In this case, where a larger display is desired, the system provides to the sales agent a list of available nearby large-screen displays. By selecting one of the listed large-screen displays using, for example, the stylus 126 on the display screen 124, the sales agent can actuate the system so that the information to be provided is routed by the system to the large display. The large screen display can be part of a product information kiosk located at convenient locations on the sales floor of the store. The large screen display can thus be brought into the interaction to provide a better view of additional information for the customer.

By way of illustration, several exemplary customer interactions are provided. These illustrate the connection between the system and the interaction. In the following text, contextual information usable by the system is show in bold text. Keywords are show in BOLD UPPER CASE letters.

Scene One

A customer comes to the Home Theatre Department of a local home electronics and appliance store. Mike, a sales representative employed by the store, approaches the customer. Mike carries a portable computer and wears a wireless headset similar to those described above in conjunction with FIG. 1. Mike asks the customer, "Hi, my name is Mike. How can I help you?"

"I need a cable to hook up my DVD player and a big screen TV."

"So, you're looking for a VIDEO CABLE then. Do you know what kind of cable you want?"

"I'm not quite sure. Can you show me what you have?"

"Absolutely . . . let's see . . . "

Figure 4:
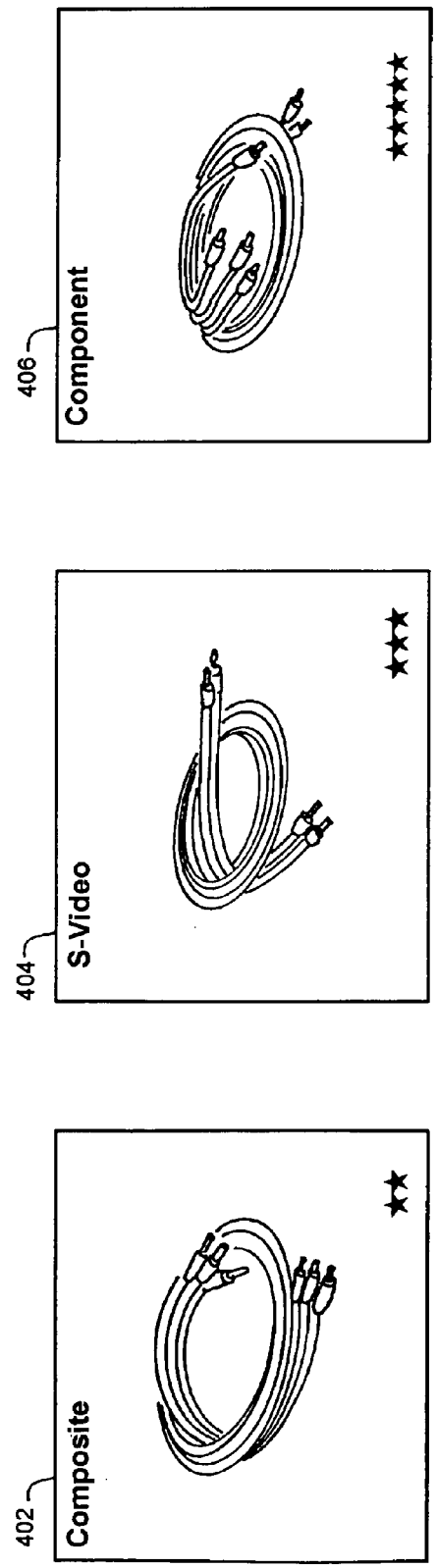
FIG. 4 shows an exemplary screen shot with content produced in response to detection of the keyword VIDEO CABLE.

Mike turns around to share the tablet PC screen with the customer. FIG. 4 shows an exemplary screen shot with content 400 produced in response to detection of the keyword VIDEO CABLE and determination that the customer and Mike are in the Home Theater Department. The screen shows three types of video cables: composite, s-video, and component. The three cable types are presented in three content display areas 402, 404, 406. Each content display area 402, 404, 406 lists advantages and disadvantages for each type of video cable. In other embodiments, additional content including advertising, related products and featured products may be displayed elsewhere on the display, such as at the bottom. In accordance with one preferred embodiment, each of the content display areas contains a hyperlink to additional related information. For example, clicking on the Component video cable content display area 406 redirects the display of the portable computer to a more detailed screen with information about more component video cable products.

Scene Two

As he's finishing up with taking care of the current customer, Mike notices another customer at the Computers/Home Office Department across the aisle. The customer looks somewhat lost. Mike quickly walks up to him, and says:

"Hi, my name is Mike. How can I help you?"

"Oh . . . yeah. I've just got my DSL connection up running at home. My two kids are constantly fighting to get on the Internet. A friend of mine told me I can share my DSL line among the two computers I have."

"That's correct. What you're looking for is a HOME NETWORK."

"Yes, that's it. Now I remember. My friend told me I can link them up without any wires."

"It's called "WIRELESS NETWORK"—very popular these days. Would you like to know what you need to get your HOME NETWORK up running?"

"Sure . . . "

"Let me show you . . . "

Figure 5:
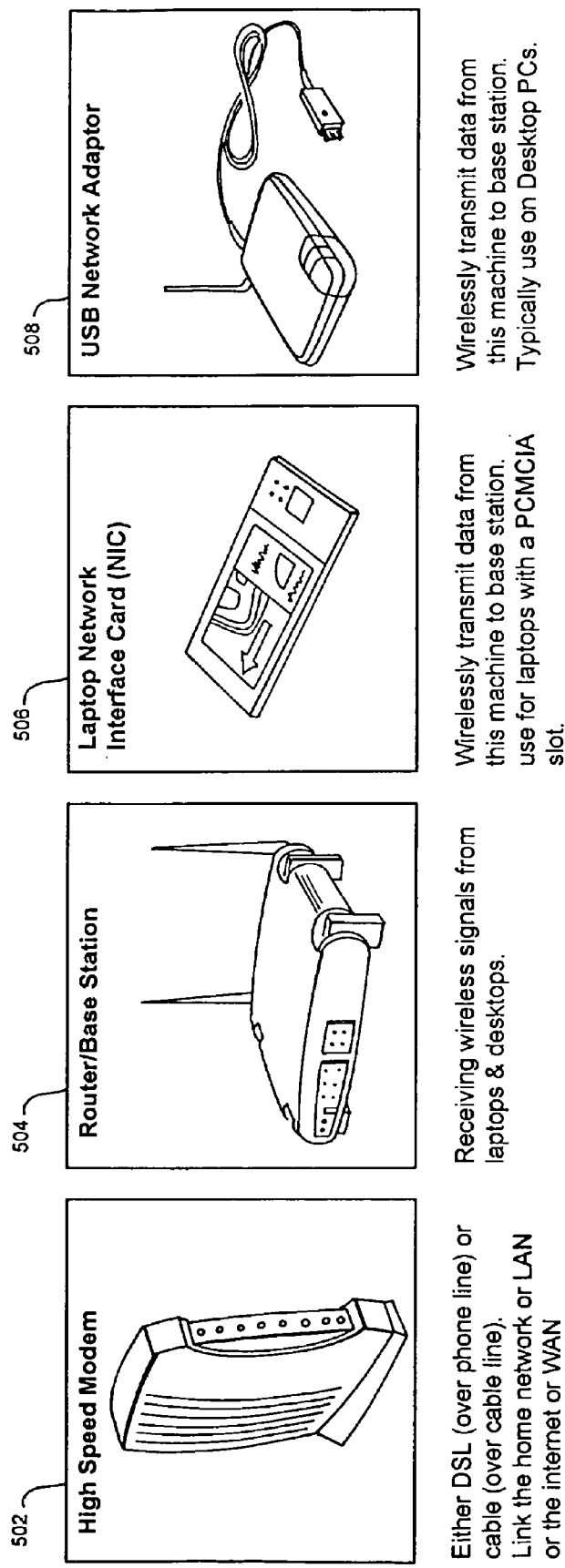
FIG. 5 shows an exemplary screen shot with content produced in response to detection of the keyword WIRELESS NETWORK.

Mike turns around to share the tablet PC screen with the customer. FIG. 5 shows an exemplary screen shot with content 500 produced in response to detection of the keyword WIRELESS NETWORK and determination that the customer and Mike are in the Computers/Home Office Department. The screen shows four content display areas 502, 504, 506, 508 including four main components of a wireless network: a HIGH SPEED MODEM, a ROUTER, a LAPTOP NETWORK INTERFACE CARD, and A USB NETWORK ADAPTOR. Since the customer already has DSL connection, what he needs now is a router and network cards. Each of the four content display areas 502, 504, 506, 508 includes a hyperlink to addition relevant information. The stylus of the portable computer may be used to activate one of the hyperlinks. Clicking on the router hyperlink of the content display area 502 redirects the portable computer to another screen with more featured router products.

At this time, the customer suddenly asks the question,

"What are the differences between these routers? Are they compatible with each other?"

"Yes and no. There are different kinds of WIRELESS STANDARDS . . . let me know show you . . . "

In response to detection of the keyword WIRELESS STANDARDS, the tablet PC screen next shows a table that compares 802.11b, a, and g wireless standards, and the features each of them supports. FIG. 6 shows an exemplary screen shot with content 600 produced in response to detection of the keyword WIRELESS STANDARDS. The content in FIG. 6 is arranged in the form of a table 602, with information provided about each of the respective standards. The wireless standards are named along the rows of the table 602. Each of the columns of the table 602 identifies a performance aspect of the standard, such as operating speed and frequency, range, compatibility and popularity.

At this point, Mike observes,

"This table is kind of hard to read. Let me see whether I bring it on to the large screen over here."

Mikes clicks on the tablet PC, and the full content displayed in FIG. 6 shows up at a nearby large plasma display. The system detects the actuation of the tablet PC and routes the content through the wireless communication network 106 (FIG. 1) or a wireline data communication network to a suitably equipped display device. Mike and the customer review the comparison table of the three wireless standards, and the customer finally decides to go with an 802.11b router.

Scene Three

As Mike returns to the Home Theatre Department, a rushing customer approaches him and asks, "Hey . . . can you tell me the difference between LCD and plasma TV?"

"Hmmm . . . you want to know the differences between LCD AND PLASMA TVS . . . let me see . . . "

Figure 7:
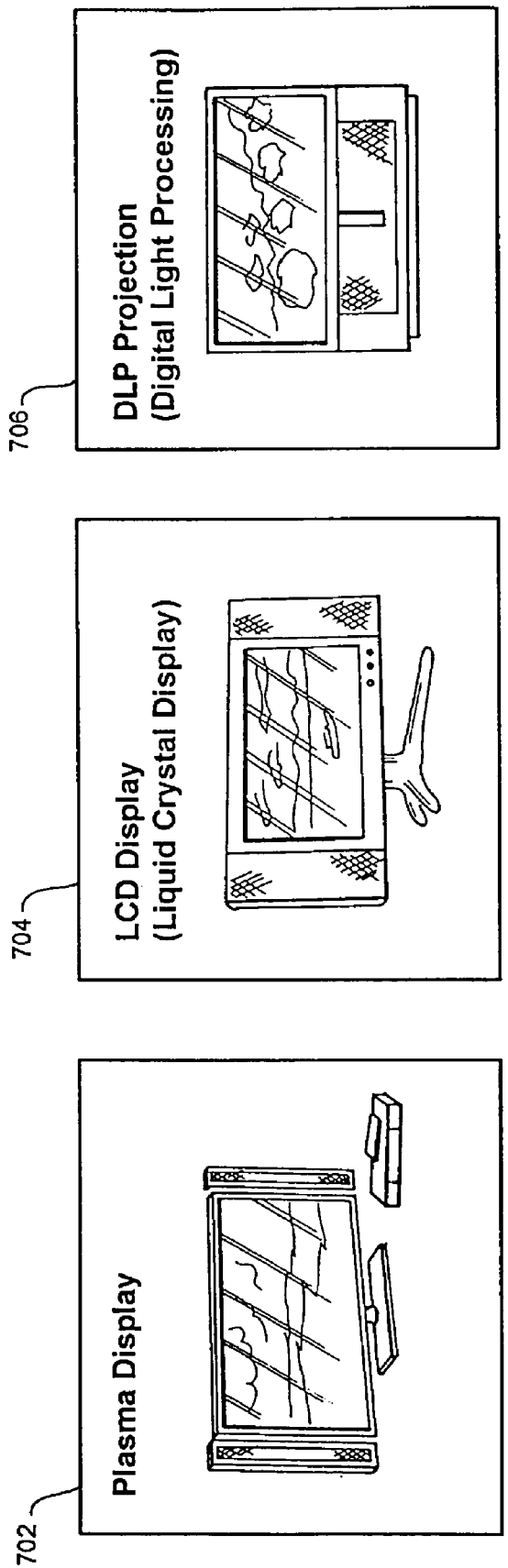
FIG. 7 shows an exemplary screen shot with content produced in response to detection of the keyword LCD AND PLASMA TVS.

Mike turns around to share the tablet PC screen with the customer. FIG. 7 shows an exemplary screen shot with content 700 produced in response to detection of the keyword LCD AND PLASMA TVS. The display includes three content display areas 702, 704, 706. The screen compares three types of flat panel displays: Plasma, LCD, and DLP, including size, brightness, contrast, and burn-in. Each of the content display areas 702, 704, 706 is associated with a hyperlink. By actuating the hyperlink, for example, using the stylus on the display of the portable computer, redirects the portable computer to specific information. As an example, FIG. 8 shows an exemplary screen shot with content 800 produced in response to a clickthrough on the hyperlink Plasma TV of FIG. 7. FIG. 8 shows a more detailed list of products in the plasma TV group.

FIG. 9 is an exemplary product knowledge tree 900 for use with the departments in the exemplary home appliance and electronics store of FIG. 3. The product knowledge tree 900 models the knowledge about departments, categories of products within departments, types of products within the product categories, and so on, even to the brand and model level. The root of the product tree is the identifier of the home appliance and electronics store, ESB Electronics, block 902.

Organized hierarchically beneath the root level at block 902 is the department level. Corresponding to the departments in the store 300 (FIG. 3), the product knowledge tree 900 includes a block 904 for the music and movies department 312, a block 906 for the home theater department 304, a block 908 for the home office department 306, a block 910 for the mobile and wireless communications department 308, a block 912 for the home appliances department 302, a block 914 for the computers department 310, and a block 916 for the digital imaging department 314.

Each block of the product knowledge tree 900 models the product information relevant to that block and the blocks hierarchically contained therein. In FIG. 9, some blocks are shown expanded to illustrate the hierarchical relationship. Thus, block 906 is expanded to show its components, block 920 for DVD Players and recorders, block 922 for Televisions and block 924 for Accessories. Similarly, block 914 for Computers contains product information for a variety of computer types, such as PDAs and handheld computers in block 926, home networking devices in block 928, desktop computers in block 930 and computer software in block 932. Within the product category of home networking, block 928 contains product information about product types including wireless networks, block 934 and wired networks, block 936. Still further, within the product category of wireless networks, block 934 contains product information about product types including cable and DSL modems, block 940, wireless routers, block 942, and network interface cards, block 944. The product information may be further categorized or broken down hierarchically.

Each of the blocks in the product knowledge tree 900 corresponds to data and information about the identified topic stored in a database such as the database 112 of the system 100 described above in conjunction with FIG. 1. The data and other information may include text data, audio and video data, graphical data and other information for display to a customer. The data stored in the database may also define the hierarchical relationships modeled in FIG. 9.

An important function of the system and method described herein is using keywords from the conversation between a sales agent and a customer, along with other contextual information to determine where in the product knowledge tree 900 to access relevant information to be transmitted to the sales agent for use in the interaction. For example, if the system detects the keyword "home theater" uttered by the sales agent, the system will access data associated with block 906 of the product knowledge tree 900 in FIG. 9. Here, the context is provided by the decoded keyword. In another example, if the location engine for the 802.11 system determines that the interaction is taking place in the computers department, corresponding to block 914, and the system detects the keyword "wireless network," the system can jump to information associated with block 934 to retrieve relevant data for use by the sales agent. The information retrieved might be that illustrated in FIG. 5 or FIG. 6, including graphical and textual information for the sales agent to collaborate with the customer in answering customer questions.

The product knowledge tree 900 of FIG. 9 is exemplary only. In other embodiments, the tree 900 will have different formats and model different types of information. While the information modeled in FIG. 9 is modeled hierarchically, the nature of the product knowledge tree used by the system described herein is not so limited. Other types of data organization may be used and will be used. A different type of retail store will have different departments and different products and thus be organized differently. If the product knowledge tree models pharmaceutical products for presentation to a physician by a pharmaceutical sales agent, the triggers and keywords and thus the product knowledge tree may reflect patient illnesses or symptoms or diagnoses, or other system input features.

Thus, it can be seen that the product knowledge tree for use with the system described herein may be arranged in a custom manner. The tree's arrangement may be dedicated to the particular knowledge contained in the tree and the manner of accessing and presenting that knowledge. The more specifically a tree is constructed around a problem, the more responsive the user, in conjunction with the system, can be.

FIGS. 10-14 illustrate exemplary grammars for use by the system 100 of FIG. 1 in processing speech detected by the system. The grammars illustrated in FIGS. 10-14 may be implemented using a Microsoft Speech Server, available from Microsoft Corp., Redmond, Wash., or other speech processing device. The grammars form an interface to create an application using Speech Application Language Tags (SALT) or a Voice XML file. The SALT or Voice XML file is used for further processing by the system in response to the speech detected by the grammars.

As described herein, in one embodiment, it is envisioned that the system will detect and respond to speech of a sales agent interacting with a customer, such as in an electronics retail store. The sales agent is equipped with a wireless head set or carries a portable computer such as a Tablet PC. This equipment detects the speech and processes it directly or conveys it to another location, such as over a wireless network to a speech server, for processing. In one embodiment, the sales agent engaged in conversation with the customer is trained to repeat key words for detection by the system. The grammars of FIGS. 10-14 illustrate processing of the speech to identify a predetermined set of key words. Upon detection, the key words are used to identify at least a part of the context of the interaction between the sales agent and the customer. Based on the context, the system retrieves context-specific information for presentation to the sales agent and the customer.

Figure 10:
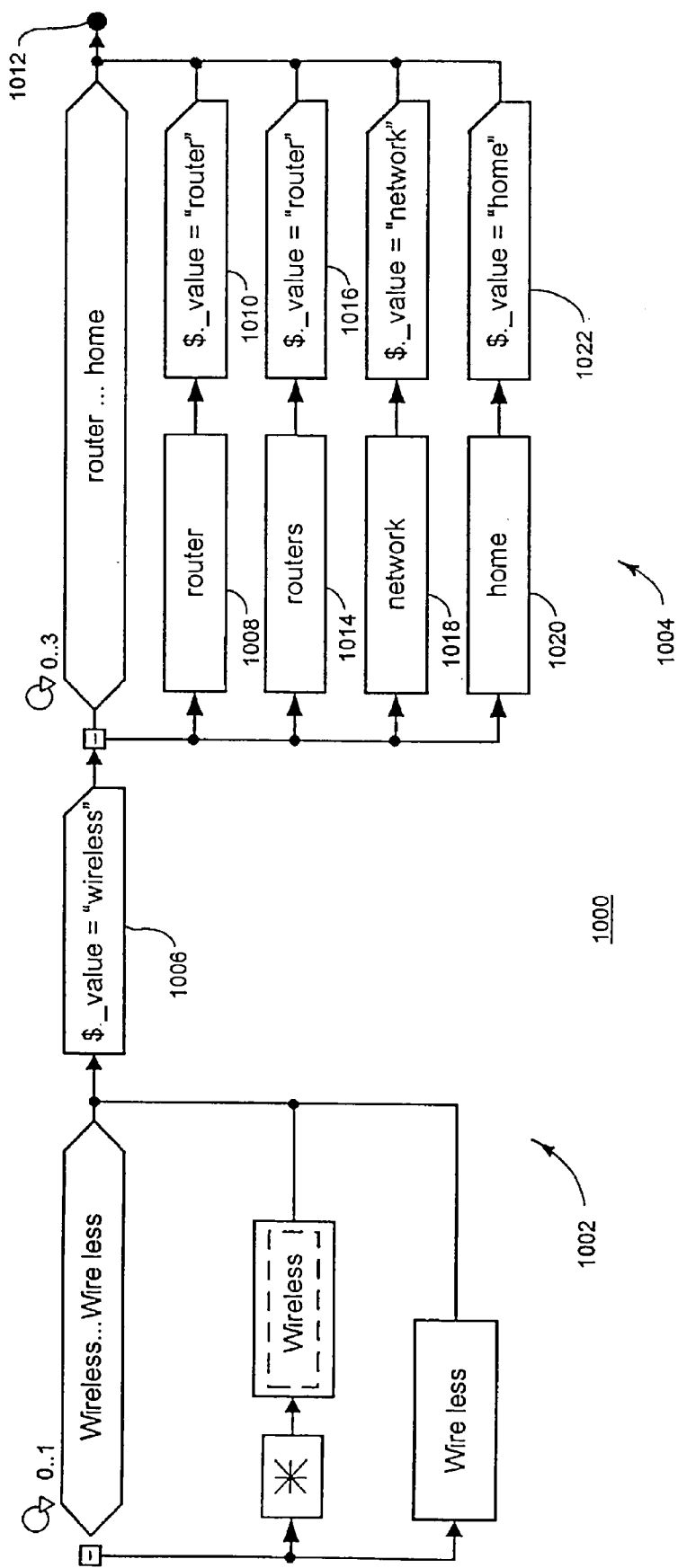
FIGS. 10-14 illustrate exemplary grammars for use by the system 100 of FIG. 1 in processing speech detected by the system.

FIG. 10 illustrates an exemplary grammar 1000 for processing speech related to wireless routers and home network equipment. A first grammar portion 1002 detects the word "wireless" or variants. A second grammar portion 1004 detects the word "router" or other specified variants.

In the first grammar portion 1002, if the word "wireless" is detected by itself or in combination with any other speech, at assignment block 1006, the value "wireless" is assigned.

In the second grammar portion 1004, the speech following the detected word "wireless" is processed. Several alternatives are considered. At block 1008, if the word "router" is detected, the value "router" is assigned at block 1010 and the detected speech "wireless router" is returned at block 1012. At block 1014, if the word "routers" is detected, the value "router" is assigned at block 1016 and the detected speech "wireless routers" is returned at block 1012. At block 1018, if the word "network" is detected, the value "network" is assigned at block 1018" and the detected speech "wireless network" is returned at block 1012. Finally, at block 1020, if the word "home" is detected, the value "home" is assigned at block 1022 and the detected speech "wireless home" is returned at block 1012. It will be appreciated that the grammar 1000 can be designed to detect any number of other word combinations or speech fragments.

In accordance with the exemplary embodiment described herein, the detected speech returned by the grammar 1000 at block 1012 is used to access product data at a predetermined point in a product knowledge tree such as the product knowledge tree 900 of FIG. 9. For example, if the grammar 1000 returns the detected speech "wireless network," the system accesses data associated with block 934 of FIG. 9. This data defines product information related to wireless network products and standards which can be returned to the sales agent for sharing with the customer.

The detected speech returned by the grammar 1000 thus defines the context, or one context of multiple contexts, of the interaction between the sales agent and the customer. Other contexts may be defined by additional detected speech, such as a brand name or a specific product. Other contexts may be defined by the location engine which pinpoints the location of the sales agent and the customer in the electronics retail store. For example, the location engine may detect that the sales agent and his Tablet PC are in the mobile and wireless department 302 (FIG. 3) and return the value "wireless networks." The system uses this contextual information, along with the product knowledge tree, to retrieve context-appropriate information.

Figure 11:
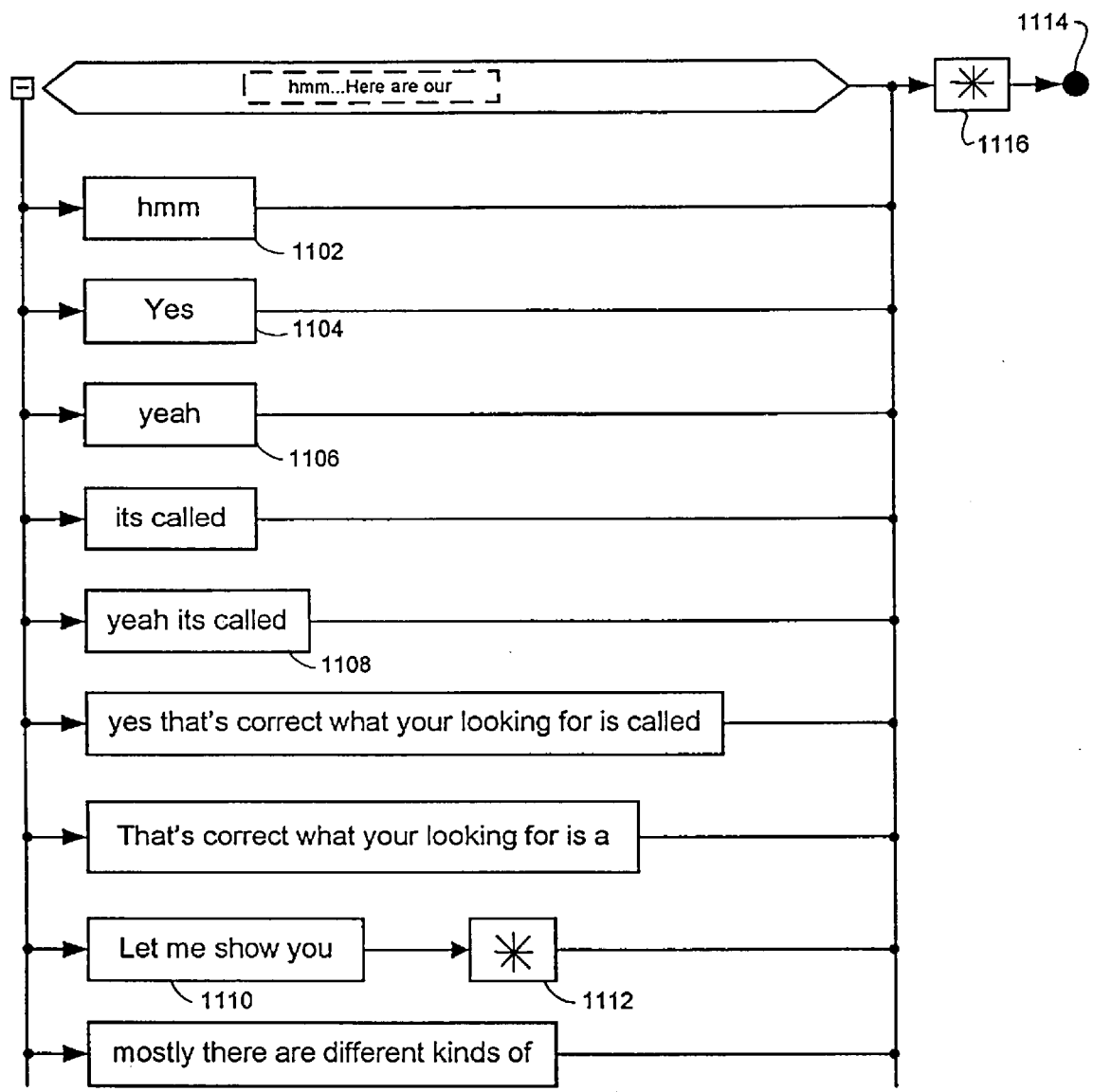

FIG. 11 illustrates one embodiment of a greeting grammar 1100 for processing a customer greeting spoken by a sales agent. The greeting grammar 1100 is shown displayed on a Microsoft Windows Development Environment window suitable for developing grammars and other speech processing tools. The greeting grammar 1100 detects several initial conversational possibilities uttered by the sales agent which may indicate that the sales agent is beginning an interaction with a customer. At block 1102, the utterance "hmmm" is detected. At blocks 1104, 1106, other initial conversational possibilities such as "yes" and "yeah," respectively, are tested.

If one of the specified greetings is detected by the grammar 1000, at block 1114 the value is returned for further processing by the system. The grammar 1100 includes a wildcard block 1116 which operates to detect a few undefined words which may follow the defined greeting terms.

As shown in FIG. 11, the grammar 1100 is designed to detect a wide range of other conversation initiations, including "yeah, it's called . . . " at block 1108, and "let me show you . . . " at block 1110. Block 1110 in the grammar 1100 is followed by wildcard block 1112, which operates to detect a few undefined words which may follow the words "let me show you . . . " at block 1110 so that, no matter what words follow these words, the greeting is returned at block 1114.

The grammar 1100 may be supplemented to include any of a wide variety of possible conversational initiations. The embodiment shown in FIG. 11 is exemplary only.

Figure 12:
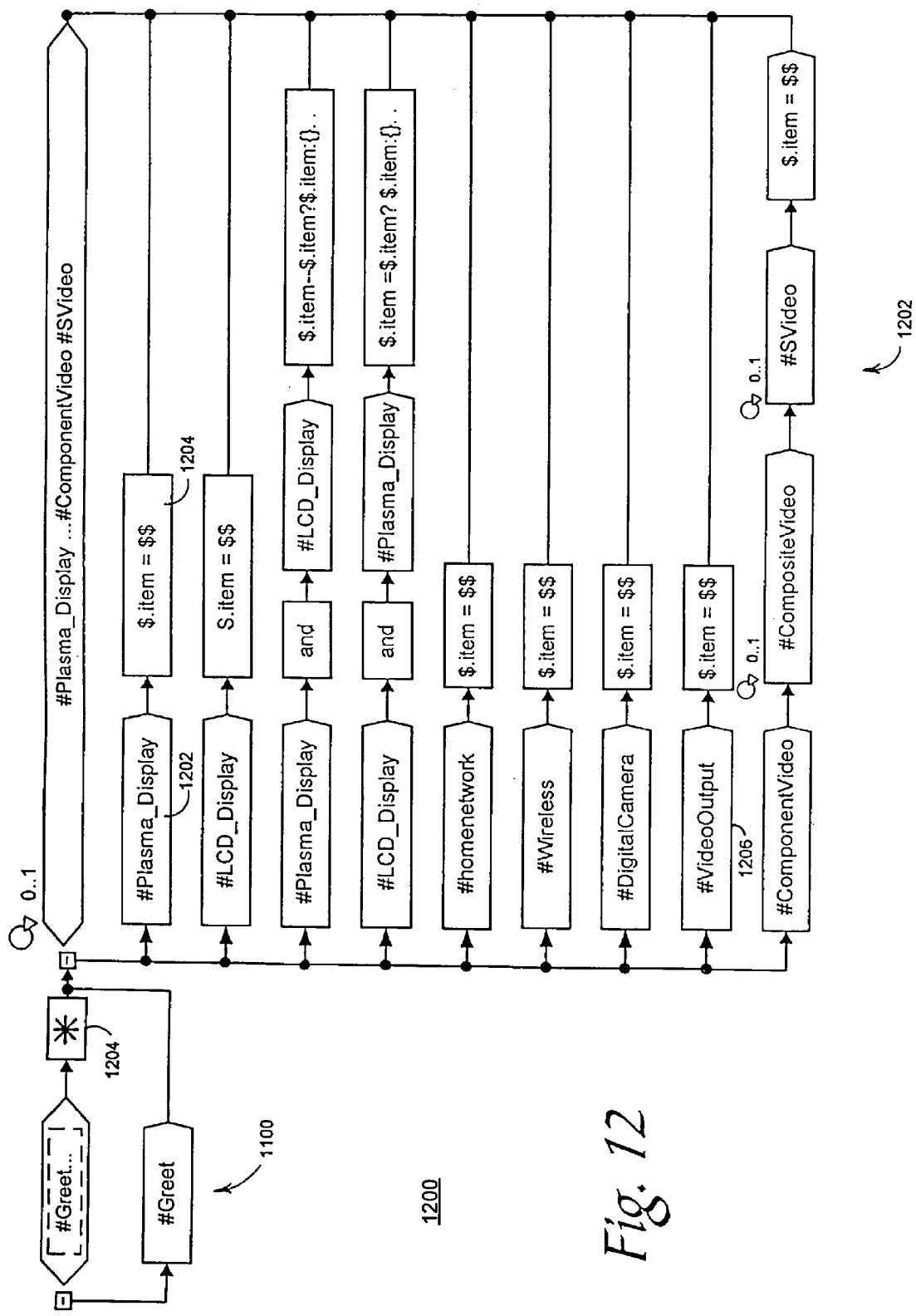

FIG. 12 shows a grammar 1200 which detects concatenation of the greeting grammar 1100 (FIG. 11) with a product definition grammar portion 1202. The grammar 1200 also includes a wildcard block 1204 so that even if a few undefined words are interposed between the greeting grammar 1100 and the product definition grammar portion 1202, the grammar 1200 will still properly detect the designated speech.

The product definition grammar portion 1202 is designed to detect speech related to different possible product types and set a variable value accordingly. For example, block 1206 determines if a plasma_display product type has been referenced in the processed speech, the variable "item" is set equal to the value "plasma_display" at block 1208.

Figure 13:
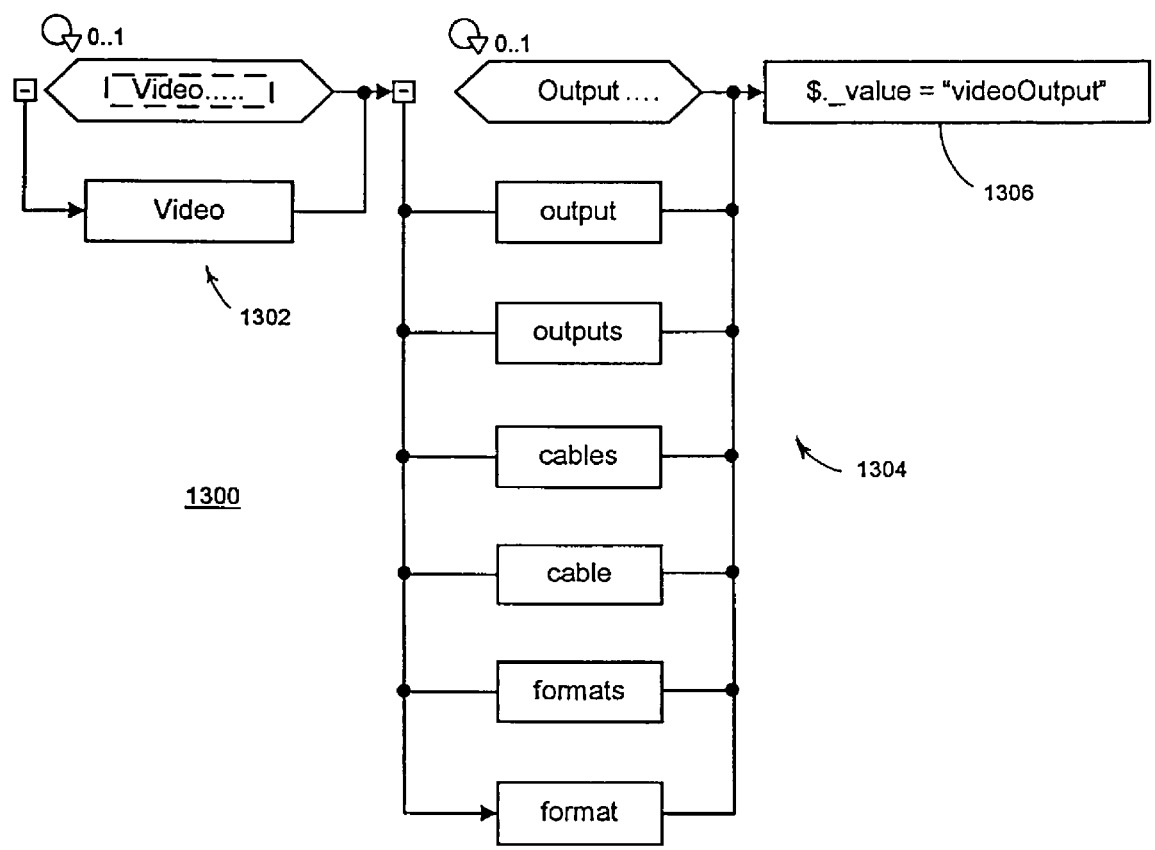

Each of the blocks such as the block 1206 within the product definition grammar portion 1202 implements a grammar to identify designated words. For example, block 1206 processes detected speech to identify words related to video outputs. FIG. 13 shows a grammar 1300 which implements a portion of block 1206 of FIG. 12. The grammar 1300 includes a video identification block 1302 and an output identification block 1304. The output identification block 1304 is expanded to show additional detail in the view of FIG. 13. The video identification block 1302 identifies words in the detected speech which relate to or correspond to video devices. Similarly, the output identification block 1304 identifies words in the detected speech which relate to or correspond to the word "output." Examples in the exemplary grammar 1300 include "output," "outputs," "cables," "cable," "formats," and "format." The grammar 1300 including the output identification block 1304 may be designed to detect other words or word combinations as well. If one of the words designated by the video identification block 1302 is identified in conjunction with one of the words designated by the output identification block 1304, the variable "value" is set equal to videoOutput at block 1308 and this value is returned to the product definition grammar 1202 (FIG. 12).

As described above, the values returned by the respective grammar portions are used to identify the context of the interaction between the sales agent and the customer. In a typical embodiment, the sales agent is trained to paraphrase questions or queries from the customer or to repeat portions of the question. In particular, the sales agent is trained to repeat predetermined key words for processing by the system to identify the context and provide relevant product information. The grammars described herein correspond to these keywords and are used for processing the speech detected from the sales agent to locate the appropriate content related to the products of interest to the customer. Thus, the sales agent will have some familiarity with the product organization and brand names available, so that suitable keywords can be stated.

Figure 14:
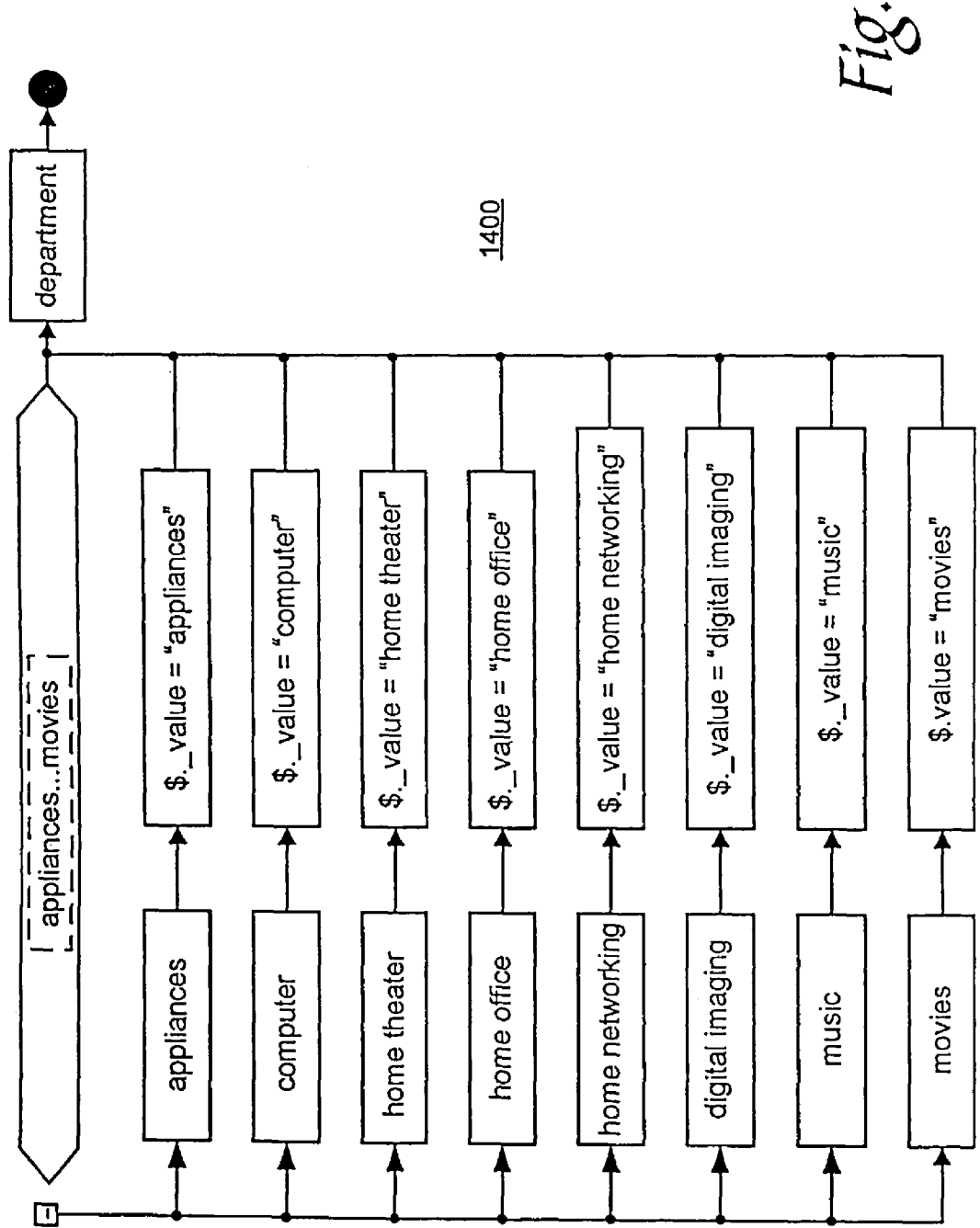

FIG. 14 illustrates an exemplary grammar 1400 showing identification of the department-level context of an interaction between the sales agent and the customer. Based on the spoken department name, such as "appliances" or "computer," the value is returned by the grammar 1400. In this manner, the system can move through the product knowledge tree, FIG. 9, to select and retrieve appropriate information. The context provided by the grammar 1400 may be subsequently supplemented by or replaced with additional context information detected by the system. The system can dynamically react to the conversation between the parties to present, in a just-in-time fashion, appropriate information.

From the foregoing, it can be seen that the present embodiments provide several tools for assisting an interpersonal interaction, such as an interaction between a sales agent and a customer. In one aspect, a real-time performance support tool is provided which enables the sales agent to retrieve information in real time as the conversation between the two individuals' progresses. The tool listens unobtrusively to keywords spoken by the sales agent. Upon encountering a keyword defining a context of the interaction, the system retrieves content and pushes the content to a portable computer used by the sales agent. The content is available to answer customer questions, move the customer to a purchase decision and to close the sale.

Another embodiment provides a just-in-time learning tool. During an interaction such as the conversation between a sales agent and a customer, the sales agent may have limited knowledge or training about the subject matter. However, the tool derives the context of the conversation and by listening non-obtrusively, determines what content is needed by the sales agent to proceed. The content is provided as-needed by the sales agent, enabling the sales agent to be responsive to the customer despite limited knowledge and training.

Another embodiment provides a collaboration tool for the sales agent and the customer. The system listens to the conversation between the two and non-obtrusively serves up information in response to detected keywords. As each individual poses questions or makes comments that include key words, the key words are detected and relevant content provided to the shared portable computer. The newly provided content focuses and directs the collaborative effort between the two individuals and refines their shared knowledge until they reach a resolution.

As noted, the system features non-obtrusive operation. The system listens in the background of the conversation and quietly awaits the right triggers that link the current context to the right content. This means that, in the exemplary embodiment, the sales agent does not need to explicitly tell the system what to do (as viewed by the customer). In one embodiment, the sales agent paraphrases the customer's question so that the headset microphone can pick up the right keyword context. In other embodiments, the microphone of the portable computer can detect all conversational keywords from both parties.

Further, the system makes use of a variety of contexts in identifying content to serve to the portable computer. The keywords used during the conversation between the sales agent and the customer form one important context. Another context, namely the real-time location of the conversation, is used as well. In some embodiments, the system uses the two contexts together to better pinpoint what might be relevant to the customer.

It is therefore intended that the foregoing detailed description be regarded as illustrative rather than limiting, and that it be understood that it is the following claims, including all equivalents, that are intended to define the spirit and scope of this invention.

The invention claimed is:

1. A method comprising:
   detecting, in an interaction between a sales agent and a customer, spoken words of at least one of the sales agent and the customer;
   determining a first geographic location relevant to the interaction between the sales agent and the customer;
   based on the determination of the first geographic location relevant to the interaction between the sales agent and the customer, determining a first product type associated with the first geographic location relevant to the interaction between the sales agent and the customer;
   filtering data associated with the detected spoken words to prioritize identification of a first context relevant to the first product type associated with the first geographic location relative to identification of a context relevant to a second product type associated with a second geographic location, the second product type being different than the first product type and the second geographic location being different than the first geographic location;
   determining, by a processor, a context of the interaction based on the filtering;
   linking the determined context to stored product information relevant to the determined context of the interaction;
   retrieving, by a processor, the stored product information relevant to the determined context of the interaction; and
   providing the retrieved information in an electronically presentable format to the sales agent,
   wherein detecting, in the interaction between the sales agent and the customer, spoken words of at least one of the sales agent and the customer comprises detecting, in an interaction between a sales agent and a customer occurring in a retail sales store, spoken words of at least one of the sales agent and the customer;
   wherein determining the first geographic location relevant to the interaction between the sales agent and the customer comprises determining a first location in the retail sales store where the interaction between the sales agent and the customer is occurring;
   wherein determining the first product type associated with the first geographic location relevant to the interaction between the sales agent and the customer comprises determining a first product type located in an area of the retail sales store that corresponds to the first location in the retail sales store where the interaction between the sales agent and the customer is occurring; and
   wherein filtering data associated with the detected spoken words to prioritize identification of a context relevant to the first product type associated with the first geographic location relative to identification of a context relevant to a second product type associated with a second geographic location comprises filtering data associated with the detected spoken words to prioritize identification of a context relevant to the first product type located in the area of the retail sales store that corresponds to the first location in the retail sales store where the interaction between the sales agent and the customer is occurring relative to identification of a context relevant to a second product type located in another area of the retail sales store that does not correspond to the first location in the retail sales store where the interaction between the sales agent and the customer is occurring.

2. The method of claim 1, wherein filtering data associated with the detected spoken words to prioritize identification of a context relevant to the first product type located in the area of the retail sales store that corresponds to the first location in the retail sales store where the interaction between the sales agent and the customer is occurring relative to identification of a context relevant to a second product type located in another area of the retail sales store that does not correspond to the first location in the retail sales store where the interaction between the sales agent and the customer is occurring comprises looking only for information concerning products that fall into a specific department associated with the area of the retail sales store that corresponds to the first location in the retail sales store where the interaction between the sales agent and the customer is occurring, rather than looking for information concerning products offered in the entire retail sales store.

3. The method of claim 1, wherein providing the retrieved information in an electronically presentable format to the sales agent comprises displaying, on a portable computer used by the sales agent, the retrieved information such that the sales agent and the customer are able to view the displayed information on the portable computer together at the first location in the retail sales store.

4. The method of claim 3, wherein providing the retrieved information in an electronically presentable format to the sales agent further comprises:
   determining that the retrieved information includes too much content to be readably displayed on the portable computer used by the sales agent;
   in response to determining that the retrieved information includes too much content to be readably displayed on the portable computer used by the sales agent, providing, to the sales agent, a list of available displays that have a larger screen than the portable computer used by the sales agent and that are located in the retails sales store nearby the first location in the retail sales store where the interaction between the sales agent and the customer is occurring;
   receiving, based on input provided by the sales agent, selection of a display included in the list of available displays that have a larger screen than the portable computer used by the sales agent and that are located in the retails sales store nearby the first location in the retail sales store where the interaction between the sales agent and the customer is occurring; and
   based on the selection, routing the retrieved information to the selected display.

5. The method of claim 1, wherein detecting, in the interaction between the sales agent and the customer, spoken words of at least one of the sales agent and the customer comprises detecting, in an interaction between a sales agent and a customer, spoken words of both the sales agent and the customer.

6. The method of claim 1, wherein providing the retrieved information in an electronically presentable format to the sales agent comprises displaying, on a portable computer used by the sales agent, the retrieved information and providing, through a headset used by the sales agent, an audible signal acknowledging availability of displayed information on the portable computer used by the sales agent.

7. A sales support tool comprising:
a data processing system;
an audio input device configured to non-obtrusively detect at least part of a conversation between a sales agent and a customer;
programming code operational with the data processing system to:
detect, in an interaction between a sales agent and a customer, spoken words of at least one of the sales agent and the customer;
determine a first geographic location relevant to the interaction between the sales agent and the customer;
based on the determination of the first geographic location relevant to the interaction between the sales agent and the customer, determine a first product type associated with the first geographic location relevant to the interaction between the sales agent and the customer;
filter data associated with the detected spoken words to prioritize identification of a first context relevant to the first product type associated with the first geographic location relative to identification of a context relevant to a second product type associated with a second geographic location, the second product type being different than the first product type and the second geographic location being different than the first geographic location;
determine a context of the interaction based on the filtering;
link the determined context to stored product information relevant to the determined context of the interaction;
retrieve, by a processor, the stored product information relevant to the determined context of the interaction; and
provide the retrieved information in an electronically presentable format to the sales agent,
wherein the programming code is operational with the data processing system to detect, in the interaction between the sales agent and the customer, spoken words of at least one of the sales agent and the customer by detecting, in an interaction between a sales agent and a customer occurring in a retail sales store, spoken words of at least one of the sales agent and the customer;
wherein the programming code is operational with the data processing system to determine the first geographic location relevant to the interaction between the sales agent and the customer by determining a first location in the retail sales store where the interaction between the sales agent and the customer is occurring;
wherein the programming code is operational with the data processing system to determine the first product type associated with the first geographic location relevant to the interaction between the sales agent and the customer by determining a first product type located in an area of the retail sales store that corresponds to the first location in the retail sales store where the interaction between the sales agent and the customer is occurring; and wherein the programming code is operational with the data processing system to filter data associated with the detected spoken words to prioritize identification of a context relevant to the first product type associated with the first geographic location relative to identification of a context relevant to a second product type associated with a second geographic location by filtering data associated with the detected spoken words to prioritize identification of a context relevant to the first product type located in the area of the retail sales store that corresponds to the first location in the retail sales store where the interaction between the sales agent and the customer is occurring relative to identification of a context relevant to a second product type located in another area of the retail sales store that does not correspond to the first location in the retail sales store where the interaction between the sales agent and the customer is occurring.

8. The sales support tool of claim 7, wherein the programming code is operational with the data processing system to filter data associated with the detected spoken words to prioritize identification of a context relevant to the first product type located in the area of the retail sales store that corresponds to the first location in the retail sales store where the interaction between the sales agent and the customer is occurring relative to identification of a context relevant to a second product type located in another area of the retail sales store that does not correspond to the first location in the retail sales store where the interaction between the sales agent and the customer is occurring by looking only for information concerning products that fall into a specific department associated with the area of the retail sales store that corresponds to the first location in the retail sales store where the interaction between the sales agent and the customer is occurring, rather than looking for information concerning products offered in the entire retail sales store.

9. The sales support tool of claim 7, wherein the programming code is operational with the data processing system to provide the retrieved information in an electronically presentable format to the sales agent by displaying, on a portable computer used by the sales agent, the retrieved information such that the sales agent and the customer are able to view the displayed information on the portable computer together at the first location in the retail sales store.

10. The sales support tool of claim 9, wherein the programming code is operational with the data processing system to provide the retrieved information in an electronically presentable format to the sales agent further by:
determining that the retrieved information includes too much content to be readably displayed on the portable computer used by the sales agent;
in response to determining that the retrieved information includes too much content to be readably displayed on the portable computer used by the sales agent, providing, to the sales agent, a list of available displays that have a larger screen than the portable computer used by the sales agent and that are located in the retails sales store nearby the first location in the retail sales store where the interaction between the sales agent and the customer is occurring;
receiving, based on input provided by the sales agent, selection of a display included in the list of available displays that have a larger screen than the portable computer used by the sales agent and that are located in the retails sales store nearby the first location in the retail sales store where the interaction between the sales agent and the customer is occurring; and based on the selection, routing the retrieved information to the selected display.

11. The sales support tool of claim 7, wherein the programming code is operational with the data processing system to detect, in the interaction between the sales agent and the customer, spoken words of at least one of the sales agent and the customer by detecting, in an interaction between a sales agent and a customer, spoken words of both the sales agent and the customer.

12. The sales support tool of claim 7, wherein the programming code is operational with the data processing system to provide the retrieved information in an electronically presentable format to the sales agent by displaying, on a portable computer used by the sales agent, the retrieved information and providing, through a headset used by the sales agent, an audible signal acknowledging availability of displayed information on the portable computer used by the sales agent.

13. A method comprising:
  detecting, in an interaction between a sales agent and a customer occurring in a retail sales store, spoken words of at least one of the sales agent and the customer;
  determining a first location in the retail sales store where the interaction between the sales agent and the customer is occurring;
  based on the determination of the first location in the retail sales store where the interaction between the sales agent and the customer is occurring, processing the detected spoken words by:
    focusing on identifying keywords related to products found in an area of the retail sales store that corresponds to the first location in the retail sales store where the interaction between the sales agent and the customer is occurring, and
    avoiding keywords related to products found in other areas of the retail sales store that do not correspond to the first location in the retail sales store where the interaction between the sales agent and the customer is occurring;
  determining, by a processor, a context of the interaction based on the processing of the detected spoken words;
  linking the determined context to stored product information relevant to the determined context of the interaction;
  retrieving, by a processor, the stored product information relevant to the determined context of the interaction; and
  providing the retrieved information in an electronically presentable format to the sales agent.

14. The method of claim 13, wherein focusing on identifying keywords related to products found in an area of the retail sales store that corresponds to the first location in the retail sales store where the interaction between the sales agent and the customer is occurring and avoiding keywords related to products found in other areas of the retail sales store that do not correspond to the first location in the retail sales store where the interaction between the sales agent and the customer is occurring comprises looking only for information concerning products that fall into a specific department associated with the area of the retail sales store that corresponds to the first location in the retail sales store where the interaction between the sales agent and the customer is occurring, rather than looking for information concerning products offered in the entire retail sales store.

15. The method of claim 13, wherein detecting, in the interaction between the sales agent and the customer occurring in the retail sales store, spoken words of at least one of the sales agent and the customer comprises detecting, in an interaction between a sales agent and a customer occurring in a retail sales store, spoken words of both the sales agent and the customer.

16. The method of claim 13, wherein providing the retrieved information in an electronically presentable format to the sales agent comprises displaying, on a portable computer used by the sales agent, the retrieved information and providing, through a headset used by the sales agent, an audible signal acknowledging availability of displayed information on the portable computer used by the sales agent.

17. A sales support tool comprising:
  a data processing system;
  an audio input device configured to non-obtrusively detect at least part of a conversation between a sales agent and a customer; and
  programming code operational with the data processing system to:
    detect, in an interaction between a sales agent and a customer occurring in a retail sales store, spoken words of at least one of the sales agent and the customer;
    determine a first location in the retail sales store where the interaction between the sales agent and the customer is occurring;
    based on the determination of the first location in the retail sales store where the interaction between the sales agent and the customer is occurring, process the detected spoken words by:
      focusing on identifying keywords related to products found in an area of the retail sales store that corresponds to the first location in the retail sales store where the interaction between the sales agent and the customer is occurring, and
      avoiding keywords related to products found in other areas of the retail sales store that do not correspond to the first location in the retail sales store where the interaction between the sales agent and the customer is occurring;
    determine a context of the interaction based on the processing of the detected spoken words;
    link the determined context to stored product information relevant to the determined context of the interaction;
    retrieve the stored product information relevant to the determined context of the interaction; and
    provide the retrieved information in an electronically presentable format to the sales agent.

18. The sales support tool of claim 17, wherein focusing on identifying keywords related to products found in an area of the retail sales store that corresponds to the first location in the retail sales store where the interaction between the sales agent and the customer is occurring and avoiding keywords related to products found in other areas of the retail sales store that do not correspond to the first location in the retail sales store where the interaction between the sales agent and the customer is occurring comprises looking only for information concerning products that fall into a specific department associated with the area of the retail sales store that corresponds to the first location in the retail sales store where the interaction between the sales agent and the customer is occurring, rather than looking for information concerning products offered in the entire retail sales store.

19. The sales support tool of claim 17, wherein the programming code is operational with the data processing system to detect, in the interaction between the sales agent and the customer occurring in the retail sales store, spoken words of at least one of the sales agent and the customer by detecting, in an interaction between a sales agent and a customer occurring in a retail sales store, spoken words of both the sales agent and the customer.

20. The sales support tool of claim 17, wherein the programming code is operational with the data processing system to provide the retrieved information in an electronically presentable format to the sales agent by displaying, on a portable computer used by the sales agent, the retrieved information and providing, through a headset used by the sales agent, an audible signal acknowledging availability of displayed information on the portable computer used by the sales agent.

* * * * *